US011770267B2

(12) United States Patent
Yan et al.

(10) Patent No.: US 11,770,267 B2
(45) Date of Patent: *Sep. 26, 2023

(54) SYSTEMS AND METHODS FOR SELECTIVE PROVISIONING OF A CHARGING FUNCTION IN A WIRELESS NETWORK

(71) Applicant: Verizon Patent and Licensing Inc., Basking Ridge, NJ (US)

(72) Inventors: Lixia Yan, Basking Ridge, NJ (US); James Mathison, Warren, NJ (US); Barry F. Hoffner, Bridgewater, NJ (US); Marc Chiaverini, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/400,192

(22) Filed: Aug. 12, 2021

(65) Prior Publication Data
US 2021/0377061 A1 Dec. 2, 2021

Related U.S. Application Data

(63) Continuation of application No. 16/683,899, filed on Nov. 14, 2019, now Pat. No. 11,133,946.

(51) Int. Cl.
*H04L 12/14* (2006.01)
*G06F 16/2457* (2019.01)
(Continued)

(52) U.S. Cl.
CPC .... *H04L 12/1403* (2013.01); *G06F 16/24578* (2019.01); *H04L 67/1027* (2013.01);
(Continued)

(58) Field of Classification Search
CPC .......... G06F 16/24578; H04L 12/1403; H04L 67/1027; H04L 67/14; H04L 67/303;
(Continued)

(56) References Cited

U.S. PATENT DOCUMENTS

| 7,174,155 | B2 * | 2/2007 | Kotaluoto | ........... H04M 15/773 |
| | | | | 455/406 |
| 7,330,711 | B2 | 2/2008 | Hurtta | |

(Continued)

FOREIGN PATENT DOCUMENTS

| CA | 2421082 C | * 10/2007 | ............ H04M 15/49 |
| CN | 1459185 A | * 11/2003 | ............ H04M 15/49 |

(Continued)

OTHER PUBLICATIONS

"3rd Generation Partnership Project; Technical Specification Group Services and System Aspects; System Architecture for the 5G System (5GS); Stage 2 (Release 16)", 3GPP TS 23.501 V16.2.0, Sep. 2019.

*Primary Examiner* — Eric Nowlin

(57) ABSTRACT

A system described herein may provide for the selection of a charging function ("CHF") associated with a particular user equipment ("UE"). A particular CHF may be selected, from a group of candidate CHFs, based on CHF selection criteria respectively associated with the candidate CHFs and attribute information associated with the UE. The attribute information may describe attributes of the UE, profile information associated with the UE, and/or attributes of traffic and/or bearers associated with the UE.

20 Claims, 6 Drawing Sheets

(51) Int. Cl.
*H04L 67/1027* (2022.01)
*H04L 67/306* (2022.01)
*H04L 67/14* (2022.01)
*H04W 28/02* (2009.01)

(52) U.S. Cl.
CPC ............ *H04L 67/14* (2013.01); *H04L 67/306* (2013.01); *H04W 28/0257* (2013.01)

(58) Field of Classification Search
CPC .... H04L 67/306; H04L 67/535; H04M 15/49; H04M 15/50; H04M 15/775; H04W 4/24; H04W 28/0257
See application file for complete search history.

(56) References Cited

U.S. PATENT DOCUMENTS

| | | | |
|---|---|---|---|
| 8,687,492 B2 | 4/2014 | Walstrom | |
| 8,977,233 B2* | 3/2015 | Sharma | H04L 12/1403 |
| | | | 455/406 |
| 9,026,075 B2* | 5/2015 | Sharma | H04W 4/24 |
| | | | 455/406 |
| 9,185,540 B2 | 11/2015 | Dahl et al. | |
| 9,674,373 B2* | 6/2017 | Sharma | H04M 15/57 |
| 9,775,018 B2 | 9/2017 | Li et al. | |
| 9,848,090 B2 | 12/2017 | Cai et al. | |
| 10,057,431 B2 | 8/2018 | Tang et al. | |
| 10,115,135 B2 | 10/2018 | Livne et al. | |
| 10,904,021 B1 | 1/2021 | Lagha et al. | |
| 11,133,946 B2* | 9/2021 | Yan | G06F 16/24578 |
| 2004/0048599 A1* | 3/2004 | Kotaluoto | H04M 15/55 |
| | | | 455/405 |
| 2006/0111077 A1 | 5/2006 | Hurtta | |
| 2007/0133565 A1 | 6/2007 | Hyun et al. | |
| 2010/0023417 A1 | 1/2010 | Dahlin et al. | |
| 2012/0002548 A1 | 1/2012 | Walstrom | |
| 2012/0030077 A1* | 2/2012 | Pei | H04L 12/14 |
| | | | 705/30 |
| 2013/0031231 A1 | 1/2013 | Li et al. | |
| 2013/0058260 A1 | 3/2013 | Dahl et al. | |
| 2013/0122860 A1 | 5/2013 | Dhruva et al. | |
| 2013/0188554 A1 | 7/2013 | Cai et al. | |
| 2014/0051387 A1 | 2/2014 | Mollersten | |
| 2015/0245238 A1* | 8/2015 | Zhang | H04L 47/11 |
| | | | 370/230 |
| 2015/0381823 A1 | 12/2015 | Tang et al. | |
| 2018/0262913 A1 | 9/2018 | Ravishankar et al. | |
| 2020/0100075 A1 | 3/2020 | Chai | |
| 2020/0145538 A1 | 5/2020 | Qiao et al. | |
| 2020/0267008 A1 | 8/2020 | Chen et al. | |
| 2020/0267786 A1 | 8/2020 | Qiao et al. | |
| 2020/0267802 A1 | 8/2020 | Engelhart | |
| 2021/0046839 A1 | 2/2021 | Logvinov et al. | |
| 2021/0084456 A1 | 3/2021 | Chai | |
| 2021/0099909 A1 | 4/2021 | Nithiyanantham et al. | |
| 2021/0368306 A1* | 11/2021 | Garcia Azorero | H04M 15/66 |
| 2022/0116469 A1* | 4/2022 | Engelhart | H04M 15/85 |
| 2022/0377510 A1* | 11/2022 | Hamid | H04W 8/02 |
| 2023/0137283 A1* | 5/2023 | Yan | H04W 4/24 |
| | | | 455/418 |

FOREIGN PATENT DOCUMENTS

| | | | | |
|---|---|---|---|---|
| CN | 101299670 | | 11/2008 | |
| CN | 104205887 | | 12/2014 | |
| CN | 104429053 A | * | 3/2015 | ......... H04L 12/1403 |
| CN | 111436029 | | 7/2020 | |
| EP | 2953386 | | 12/2015 | |
| EP | 2572472 B1 | * | 12/2017 | ......... H04L 12/1403 |
| EP | 2702753 | | 2/2019 | |
| EP | 4092960 A1 | * | 11/2022 | ............ H04W 28/04 |
| KR | 20030032006 A | * | 4/2003 | |
| KR | 100801218 B1 | * | 2/2008 | |
| KR | 20120123179 A | * | 11/2012 | |
| WO | WO-0219686 A1 | * | 3/2002 | ............ H04M 15/49 |
| WO | 2004/045141 | | 5/2004 | |
| WO | WO-2010117368 A1 | * | 10/2010 | ............ G06Q 30/04 |
| WO | WO-2011144235 A1 | * | 11/2011 | ......... H04L 12/1403 |
| WO | 2012/148326 | | 11/2012 | |
| WO | WO-2014008050 A1 | * | 1/2014 | ......... H04L 12/1403 |
| WO | 2014/134819 | | 9/2014 | |
| WO | 2020/156685 | | 8/2020 | |
| WO | WO-2022106064 A1 | * | 5/2022 | |

\* cited by examiner

SYSTEMS AND METHODS FOR SELECTIVE PROVISIONING OF A CHARGING FUNCTION IN A WIRELESS NETWORK

CROSS-REFERENCE TO RELATED APPLICATION

This Application is a Continuation of U.S. patent application Ser. No. 16/683,899, filed on Nov. 14, 2019, titled "SYSTEMS AND METHODS FOR SELECTIVE PROVISIONING OF A CHARGING FUNCTION IN A WIRELESS NETWORK," the contents of which are herein incorporated by reference in their entirety.

BACKGROUND

User equipment ("UE"), such as mobile telephones or other wireless communication devices, are typically associated with a single charging function ("CHF") when provisioned for access to a wireless network. The CHF may receive or track usage associated with a given UE, which may allow an account or subscription, associated with the UE, to be charged for usage of resources of the wireless network.

DETAILED DESCRIPTION OF THE PREFERRED EMBODIMENTS

The following detailed description refers to the accompanying drawings. The same reference numbers in different drawings may identify the same or similar elements.

Embodiments described herein provide for the selection of a Charging Function ("CHF"), for a given User Equipment ("UE"), based on attributes or criteria associated with a set of candidate CHFs and attributes of the UE (and/or attributes of traffic associated with the UE). In accordance with some embodiments, different CHFs, of the set of candidate CHFs, may be used to track or record usage (and/or other information relevant to charging) for different types of services, different service providers, different UEs, and/or other differentiating factors. That is, even in situations where UEs switch providers, use different types of services, etc., embodiments described herein may provide for the selection and/or identification of an appropriate CHF to track UE usage across different providers, service types, etc.

Figure 1:
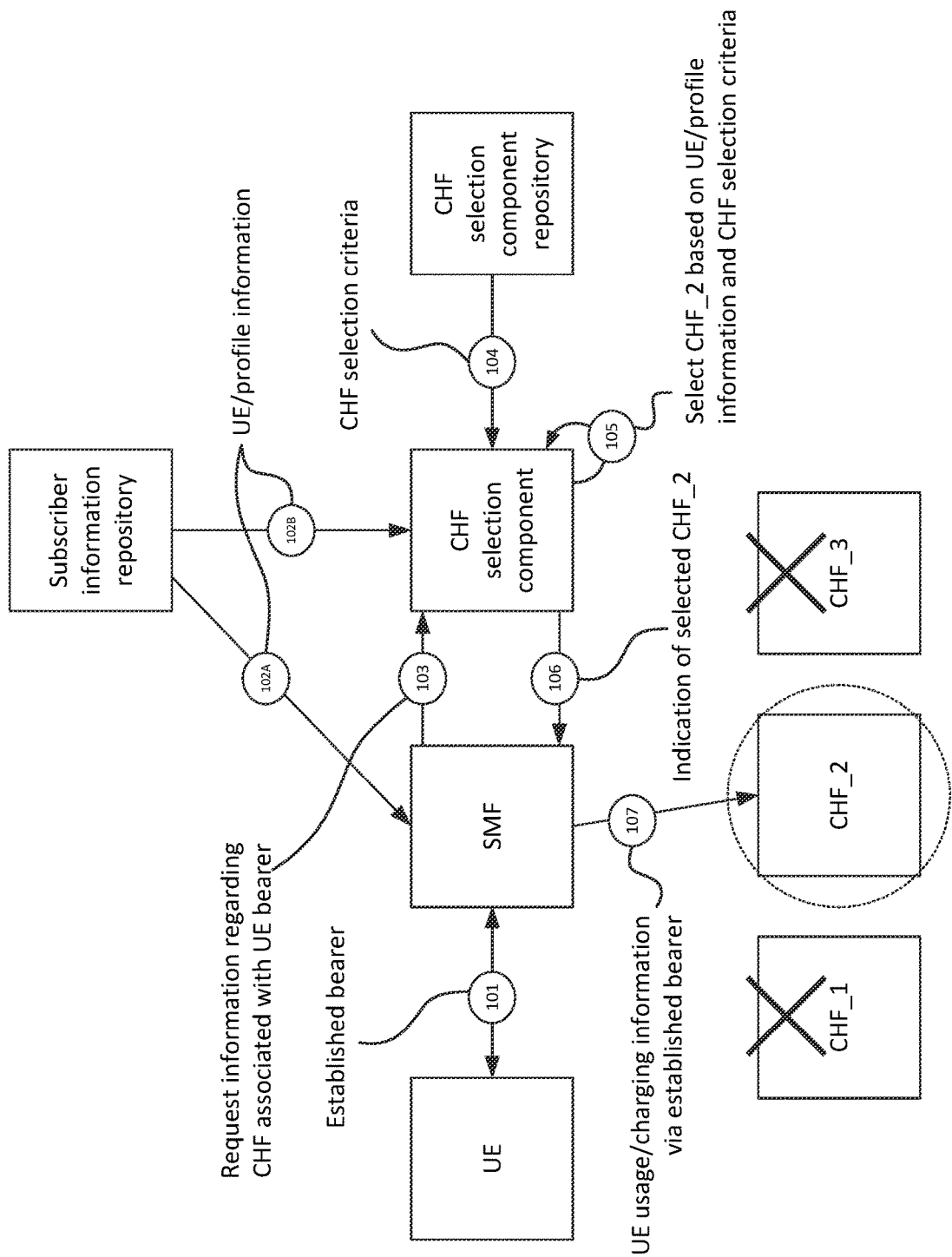
FIG. 1 illustrates an example overview of one or more embodiments described herein, in which a Charging Function ("CHF") Selection Component ("CSC") selects a CHF for a particular User Equipment ("UE") based on a comparison of UE attributes to CHF selection criteria, in accordance with some embodiments described herein.

For example, a CHF Selection Criteria Repository ("CSCR") (e.g., as shown in FIG. 1) may collect and/or store CHF selection criteria. As discussed herein, "CHF selection criteria" may include information based on which a particular CHF may be selected to track usage for a given UE (and/or for a given service associated with a given UE). As further shown in FIG. 1, a Subscriber Information Repository ("SIR") may store subscriber information (e.g., attributes associated with a given UE and/or a subscriber associated with a given UE).

FIG. 1 depicts, for example, an example overview of the selection of a CHF, from a set of candidate CHFs, based on UE/profile information (e.g., as received from the SIR) and CHF selection criteria (e.g., as received from the CSCR). For example, a UE may establish a connection with a wireless network, which may include communicating (at 101) with a Session Management Function ("SMF") and/or another network function to establish one or more bearers.

In accordance with some embodiments, the SMF may communicate with a CHF selection component ("CSC") to determine an appropriate CHF (e.g., select a CHF from a set of CHFs, such as example CHFs CHF_1, CHF_2, and CHF_3 shown in the figure) for the UE. For instance, the SMF may receive (at 102A), from the SIR and/or some other source, UE/profile information (e.g., subscription information (e.g., levels of service associated with the UE), device information (e.g., make and/or model of the UE), device type (e.g., mobile phone, tablet, Internet of Things ("IoT") device, Mobile to Mobile ("M2M") device, etc.), subscriber type (e.g., public safety, enterprise, etc.), one or more content or service providers associated with the UE or the established bearer, etc.). In some embodiments, the SMF may receive the UE/profile information from the SIR based on a UE identifier associated with the UE (e.g., Generic Public Subscription Identifier ("GPSI"), Public Land Mobile Network ("PLMN") identifier, Subscription Permanent Identifier ("SUPI"), Mobile Directory Number ("MDN"), International Mobile Subscriber Identity ("IMSI"), International Mobile Station Equipment Identity ("IMEI"), etc.) provided by the SMF.

The SMF may output (at 103) a request (e.g., to the CSC) for information regarding an appropriate CHF, to which usage information associated with the UE should be provided. The request from the SMF may include information regarding the UE (e.g., the received UE/profile information (from 102A)) and/or bearer channel(s) associated with the UE. For example, the SMF may provide information such as a slice identifier ("Slice ID") of the bearer channel, an identifier associated with the UE (e.g., a SUPI, a GPSI, a PLMN identifier, an MDN, an IMSI, an IMEI, etc.), an identifier of an application or service type associated with the established bearer (e.g., voice service, data service, name or other identifier of a particular application) and/or other suitable information.

The CSC may also receive UE/profile information from the SIR and/or some other source other than the SMF. For example, as depicted in FIG. 1, the CSC may receive (at 102B) UE/profile information from the SIR. As described above, UE/profile information may include subscription information, device information, device type, subscriber type, and/or other information. In some embodiments, where the CSC receives UE/profile information from the SMF, the CSC may not need to receive UE/profile information from the SIR and/or some other source.

The CSC may further receive (at 104) CHF selection criteria. For example, the CSC may request the UE/profile information and/or CHF selection criteria based on the request (at 103) from the SMF, and/or at some other time (e.g., before, or otherwise independent of, the request from the SMF). The CHF selection criteria may include information that may be used to differentially select between different CHFs, such as service type (e.g., voice, messaging, data, etc.), application identifier, device type, subscriber type, service provider, CHF owner/operator identification (e.g., an owner and/or operator associated with a given CHF), charging event type (e.g., session-based charging, event-based charging, etc.), charging type (e.g., "quota-management," "offline only," etc.), and/or other criteria. As depicted, the CHF selection criteria may be provided by a device such as the CSCR.

Based on the request (received at 103), the UE/profile information (received at 102B and/or 103), and/or the CHF selection criteria (received at 104), the CSC may select (at 105) an appropriate CHF (e.g., from the set of candidate CHFs). For example, assume that the request (e.g., at 103) indicates that the UE is an IoT device, and the CSC provides (at 104) information (e.g., CHF selection criteria) identifying that CHF_2 is associated with IoT devices. In this instance, as depicted, the CSC may accordingly select CHF_2 for the established bearer based on the CHF selection criteria and UE/profile information (e.g., where the CHF selection criteria indicates that CH_2 is associated with IoT devices, and where the UE/profile information indicates that the UE is an IoT device).

In some embodiments, the selection of CHF_2 may be based on the indication that CHF_2 is associated with IoT devices. In some embodiments, the selection of CHF_2 may be based on a determination that CHF_1 and/or CHF_3 (e.g., other CHFs in the set of CHFs) are not associated with IoT devices. In some embodiments, CHF_1 and/or CHF_3 may be associated with IoT devices, but other selection criteria may be used to select CHF_2 in favor of CHF_1 and/or CHF_3. For example, the CSC may generate a score for CHF_1, CHF_2, and CHF_3 that reflects a measure of similarity between the respective CHF selection criteria associated with these CHFs and the UE/profile information associated with the UE. In some embodiments, the score may be based on, and/or may otherwise reflect, one or more other factors in addition to, or in lieu of, the similarity between the CHFs and the UE/profile information. The CSC may, in such embodiments, select a particular CHF based on the score (e.g., may rank the CHFs according to the generated scores and select a particular CHF based on the ranking, such as choosing the highest ranking CHF).

As depicted, the CSC may provide (at 106) an indication of the selected CHF to the SMF. The indication may include an identifier, address, and/or other information related to utilizing the CHF associated with the established bearer channel. Once the CHF indication is provided to the SMF, the SMF may provide (at 107) usage or other charging-related information to the selected CHF (e.g., an amount of usage by the UE via the established bearer).

While described herein in the context of an SMF requesting information regarding an appropriate CHF to which usage information can be provided, similar concepts may apply for other devices or systems that request such information. For example, an application server (such as a telephony application server ("TAS"), a messaging server, a content provider, etc.) may request CHF identification information from CSC for a communication with a given UE, and may provide usage information to the selected CHF.

Figure 2:
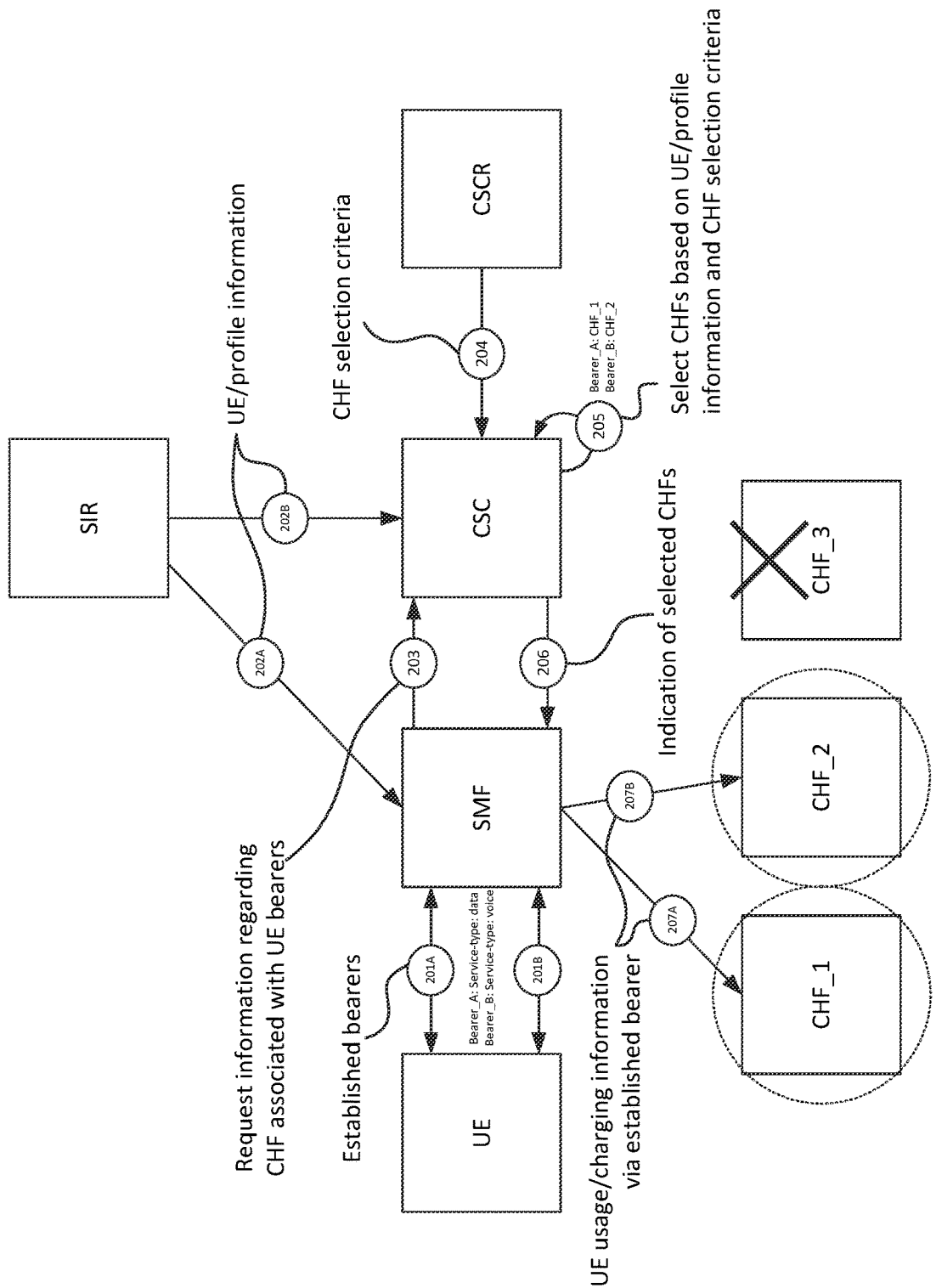
FIG. 2 illustrates an example overview of one or more embodiments described herein, in which a CSC selects multiple different CHFs for a particular UE, based on different types of service associated with the UE, in accordance with some embodiments described herein.

As briefly mentioned above, the CSC of some embodiments may select a CHF based on additional factors, such as a service type, application identifier, Slice ID, etc. For example, as shown in FIG. 2, a CSC may select multiple CHF(s) based on the established bearers utilized by a UE.

As shown, a UE may communicate with a wireless network via multiple established bearer channels. For example, Bearer_A (established at 201A) may be associated with a "data" service type, while Bearer_B (established at 201B), may be associated with a "voice" service type. While shown here as being established simultaneously, in practice, concepts described herein may be applied when these bearers (according to the different service types) are established separately or over a period of time (e.g., one bearer may be terminated and thereafter a second bearer may be established, or multiple bearer channels may exist simultaneously). Further, while described in the context of different "service types," concepts described with respect to FIG. 2 may apply to other differentiating factors between two bearers (e.g., different slice IDs, different application identifiers, times at which the bearers were established, and/or other factors).

The SMF may receive, as part of establishing the bearer channels, information regarding the bearer channels. For example, as described above, the SMF may receive information regarding the service type each bearer is associated with (e.g., as described above, Bearer_A is associated with a data service type, etc.). The SMF may receive (at 202A) information regarding the UE/profile from the SIR and/or some other source. As described above, UE/profile information may include subscription information, device information, device type, subscriber type, and/or other information. As further described above, the SMF may receive the UE/profile information based on an identifier associated with the UE (e.g., a SUPI, a GPSI, a PLMN identifier, an MDN, an IMSI, an IMEI, etc.) provided by the SMF.

As described above, in accordance with some embodiments, the SMF may use the provided information to determine an appropriate CHF for the UE. For instance, the SMF may request (at 203) information regarding the appropriate CHF for the established bearer. The request from the SMF may include some or all of the information regarding the UE and/or bearer(s) associated with the UE. For example, the SMF may provide information such as the Slice ID of the bearer channel, the SUPI, GIPSI, and/or PLMN identifier associated with the UE, and/or other information. While shown here as one request (at 203), the SMF may, in practice, output multiple requests to the CSC (e.g., one request that corresponds to each of the established bearers).

The CSC may receive (at 202B) UE/profile information (e.g., subscription information, device information, device type, subscriber type, one or more content or service providers associated with the UE or the established bearer, etc.). In some embodiments, this information may be provided by the SIR and/or some other source. In some embodiments, where the UE/profile information is provided with the request from the SMF (e.g., at 203), the CSC may not need to receive information from the SIR and/or some other source (e.g., as depicted in 202B). The CSC may further receive (at 204) CHF selection criteria (e.g., from the CSCR and/or some other source). As described above, the CHF selection criteria may include information regarding one or more CHFs (e.g., attributes of the CHF, attributes of types of traffic and/or devices for which the CHF tracks usage or charging information, etc.), based on which a particular CHF may be selected.

Based on the request (received at 203), the UE/profile information (received at 203 and/or 202B), and/or the CHF selection criteria (received at 204), the CSC may select (at 205) an appropriate CHF. As depicted here, the CSC may select two separate CHFs based on the established bearers, UE/profile information, and CHF selection criteria (e.g., select CHF_1 for Bearer_A and CHF_2 for Bearer_B). In this instance, the CSC may select CHF_1 for Bearer_A because CHF_1 may be associated with the "data" service type (e.g., a "service-type" CHF selection criteria, associated with CHF_1 may match the service type associated with Bearer_A). The CSC may not select CHF_2 in this instance, because CHF_2 may be associated with a "voice" service type (e.g., may not be associated with the "data" service type), and the CSC may not select CHF_3 because CHF_3 is also not associated with the "data" service type. Furthermore, for example, the CSC may select CHF_2 for Bearer_B because CHF_2 may indicate a more preferential (e.g., higher) CHF selection score (e.g., as described above, a measure of similarity between the CHF selection criteria provided by the CSCR and the requested service type and/or attributes of the UE, as indicated by the UE/profile information from the SIR, etc.) than the scores indicated by other CHFs (e.g., as depicted here, CHF_1 and CHF_3 may be associated with a CHF selection score lower than that of CHF_2). While shown in this example as two different CHFs being selected, in some embodiments, the same CHF may be associated with different service types (e.g., the CHF selection criteria for a given CHF may indicate multiple service types, etc.).

The CSC may provide (at 206) an indication of the selected CHF(s) to the SMF, which may provide usage or other charging-related information to the selected CHFs. As depicted, for example, the SMF may provide (at 207A) information regarding the usage or charging of Bearer_A to CHF_1 and may provide (at 207B) information regarding the usage or charging of Bearer_B to CHF_2.

Figure 3:
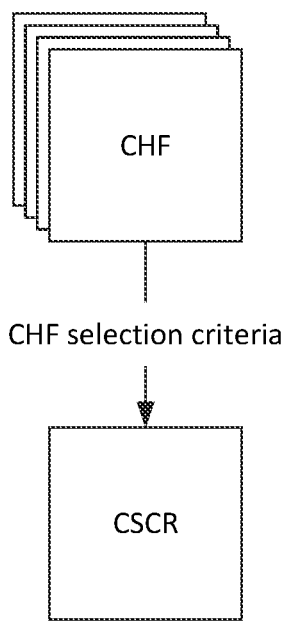
FIG. 3 illustrates an example registration with a CHF Registration Reference Repository ("CSCR"), in accordance with some embodiments.

In some embodiments, CHFs may register information with a repository maintaining information regarding the CHF selection criteria for each particular CHF. For instance, as shown in FIG. 3, multiple CHFs may be registered with the CSCR, and the CSCR may accordingly store and maintain CHF selection criteria for each particular CHF. The CHF selection criteria may include attributes of traffic and/or UEs (and/or profiles associated with UEs) which are associated with each CHF. For example, each CHF may be associated with particular UEs (e.g., the CHF selection criteria may indicate GIPSI values, SUPI values, PLMN identifiers, MDN values, IMSI values, IMEI values, or other UE identifiers), service types, application identifiers, device types, user types or descriptors (e.g., such as "first responder," "enterprise," and/or some other descriptor, which may be indicated in profile information for a given UE), service provider, CHF owner/operator identification, UE device type, charging event type, charging type, and/or other criteria managed by each respective CHF.

Figure 4:
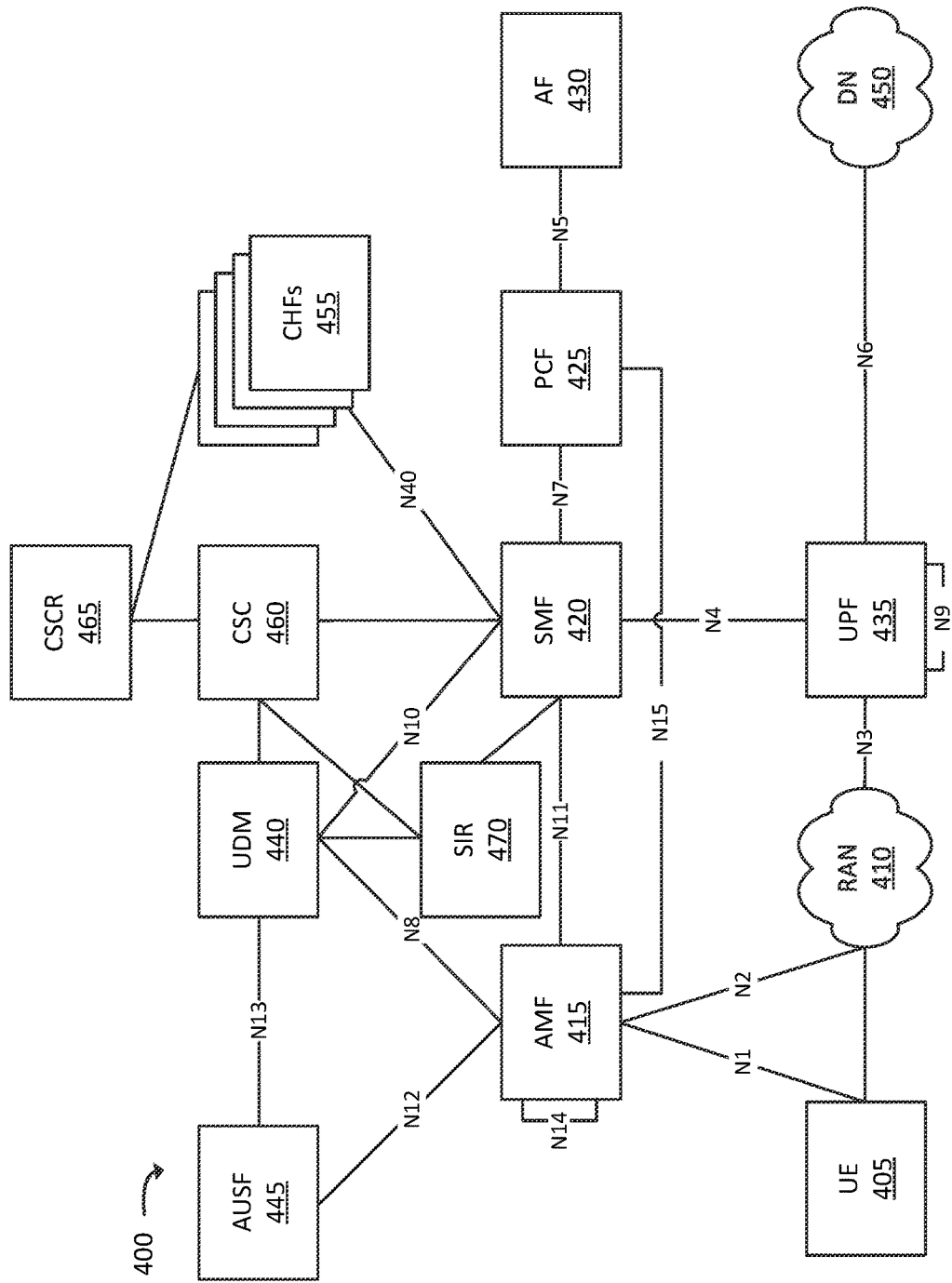
FIG. 4 illustrates an example environment in which one or more embodiments, described herein, may be implemented.

FIG. 4 illustrates an example environment 400, in which one or more embodiments may be implemented. In some embodiments, environment 400 may correspond to a Fifth Generation ("5G") network, and/or may include elements of a 5 G network. As shown, environment 400 may include UE 405, Radio Area Network ("RAN") 410, Access and Mobility Management Function ("AMF") 415, SMF 420, Policy Control Function ("PCF") 425, Application Function ("AF") 430, User Plane Function ("UPF") 435, Unified Data Management ("UDM") 440, Authentication Server Function ("AUSF") 445, Data Network ("DN") 450, CHFs 455, CSC 460, CSCR 465, and SIR 470.

The quantity of devices and/or networks, illustrated in FIG. 4, is provided for explanatory purposes only. In practice, environment 400 may include additional devices and/or networks, fewer devices and/or networks, different devices and/or networks, or differently arranged devices and/or networks than illustrated in FIG. 4. For example, while not shown, environment 400 may include devices that facilitate or enable communication between various components shown in environment 400, such as routers, modems, gateways, switches, hubs, etc. Alternatively, or additionally, one or more of the devices of environment 400 may perform one or more functions described as being performed by another one or more of the devices of environment 400. Devices of environment 400 may interconnect with each other and/or other devices via wired connections, wireless connections, or a combination of wired and wireless connections. In some implementations, one or more devices of environment 400 may be physically integrated in, and/or may be physically attached to, one or more other devices of environment 400.

UE 405 may include a computation and communication device, such as a wireless mobile communication device that is capable of communicating with RAN 410, DN 450, and/or one or more other devices or networks. UE 405 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 405 may send traffic to and/or receive traffic (e.g., user plane traffic) from DN 450 via RAN 410 and UPF 435.

RAN 410 may be, or may include, a 5G RAN that includes one or more base stations (e.g., one or more Next Generation Node Bs ("gNBs"), which UE 405 may communicate with one or more other elements of environment 400. UE 405 may communicate with RAN 410 via an air interface. For instance, RAN 410 may receive traffic (e.g., voice call traffic, data traffic, messaging traffic, signaling traffic, etc.) from UE 405 via the air interface, and may communicate the traffic to UPF 435, and/or one or more other devices or networks. Similarly, RAN 410 may receive traffic intended for UE 405 (e.g., from UPF 435, AMF 415, and/or one or more other devices or networks) and may communicate the traffic to UE 405 via the air interface. While not explicitly shown in this figure, environment 400 may include, or may be communicatively coupled to, one or more other RANs, which may implement one or more radio access technologies ("RATs") that are different from a RAT that is implemented by RAN 410. For example, one or more other RANs may implement a Long-Term Evolution ("LTE") RAT, a Fourth Generation ("4G") RAT, and/or some other RAT.

AMF 415 may include one or more devices, systems, Virtualized Network Functions ("VNFs"), etc., that perform operations to register UE 405 with the 5G network, to establish bearer channels associated with a session with UE 405, to hand off UE 405 from the 5G network to another network, to hand off UE 405 from the other network to the 5G network, and/or to perform other operations. In some embodiments, the 5G network may include multiple AMFs 415, which communicate with each other via the N14 interface (denoted in FIG. 4 by the line marked "N14" originating and terminating at AMF 415).

SMF 420 may include one or more network devices that gather, process, store, and/or provide information in a manner described herein. SMF 420 may, for example, facilitate in the establishment of communication sessions on behalf of UE 405. In some embodiments, the establishment of communications sessions may be performed in accordance with one or more policies provided by PCF 425.

PCF 425 may include one or more devices, systems, VNFs, etc., that aggregate information to and from the 5G network and/or other sources. PCF 425 may receive information regarding policies, rules, and/or subscriptions from one or more sources, such as subscriber databases (e.g., UDM 440) and/or from one or more users (such as, for example, an administrator associated with PCF 425).

AF 430 may include one or more devices, systems, VNFs, etc., that receive, store, and/or provide information that may be used in determining parameters (e.g., quality of service parameters, charging parameters, or the like) for certain applications. AF 430 may be used by one or more applications and/or entities that are external to the network to specify policies, rules, etc. that may be stored or otherwise implemented by PCF 425.

UPF 435 may include one or more devices, systems, VNFs, etc., that receive, store, and/or provide data (e.g., user plane data). For example, UPF 435 may receive user plane data (e.g., voice call traffic, data traffic, etc.), destined for UE 405, from DN 450, and may forward the user plane data toward UE 405 (e.g., via RAN 410, SMF 420, and/or one or more other devices). In some embodiments, multiple UPFs 435 may be deployed (e.g., in different geographical locations), and the delivery of content to UE 405 may be coordinated via the N9 interface (e.g., as denoted in FIG. 4 by the line marked "N9" originating and terminating at UPF 435). Similarly, UPF 435 may receive traffic from UE 405 (e.g., via RAN 410, SMF 420, and/or one or more other devices), and may forward the traffic toward DN 450. In some embodiments, UPF 435 may communicate (e.g., via the N4 interface) with SMF 420, regarding user plane data processed by UPF 435.

AUSF 445 and UDM 440 may include one or more devices, systems, VNFs, etc., that manage, update, and/or store, in one or more memory devices associated with AUSF 445 and/or UDM 440, profile information associated with a subscriber. AUSF 445 and/or UDM 440 may perform authentication, authorization, and/or accounting operations associated with the subscriber and/or a communication session with UE 405. As described above, UDM 440 may be, may be communicatively coupled with, may be implemented by, or may implement features of SIR 470 and/or CSCR 465.

DN 450 may include one or more wired and/or wireless networks. For example, DN 450 may include an Internet Protocol ("IP")-based Packet Data Network ("PDN"), a wide area network ("WAN") such as the Internet, a private enterprise network, and/or one or more other networks. UE 405 may communicate, through DN 450, with data servers, other UEs 405, and/or to other servers or applications that are coupled to DN 450. DN 450 may be connected to one or more other networks, such as a public switched telephone network ("PSTN"), a PLMN, and/or another network. DN 450 may be connected to one or more devices, such as content providers, applications, web servers, and/or other devices, with which UE 405 may communicate.

CHFs 455 may include one or more devices, systems, or VNFs that relate to charging, usage tracking, and/or similar functions. CHFs 455 may include, implement, or be communicatively coupled with devices, systems, or VNFs related to online and offline charging functionality (e.g., an Online Charging Function ("OCF") and/or a Charging Data Function ("CDF")). Further, CHFs 455 may track individual charging and usage on a per-slice basis (e.g., in environments where network functions are "sliced"). For example, CHFs 455 may track data usage on a per-slice basis for slice instances, where different slices relate to different QoS levels, different sets of UEs (e.g., one slice for one group of UEs and another slice another group of UEs), and/or other differentiating factors. CHFs 455 may further maintain information for UE 405 which may be relevant to charging and/or alert generation for a subscriber associated with UE 405, such as information relating to an amount of data that the subscriber has paid for and/or is otherwise entitled to, an amount of data remaining on a data plan (e.g., a monthly data plan), a quantity of voice call minutes that the subscriber has paid for and/or is otherwise entitled to, a quantity of voice call minutes remaining on a voice call plan (e.g., a monthly voice call plan), a quantity of messages (e.g., Short Message Service ("SMS") messages, Multimedia Messaging Service ("MMS") messages, or the like) that the subscriber has paid for and/or is otherwise entitled to, a quantity of messages remaining on a messaging plan (e.g., a monthly messaging plan), and/or other suitable information. In some embodiments described herein, CHFs 455 may register CHF selection criteria with CSCR 465 (and/or one or more other devices or systems may provide CHF selection criteria, associated with respective CHFs 455, to CSCR 465). CHFs 455 may generate or otherwise maintain charging information based on usage information from SMF 420 and/or one or more other devices or systems (e.g., an application server that provides services to UE 405, such as a TAS, a messaging application server, or the like).

CSC 460 may include one or more devices, systems, VNFs, etc., that perform one or more operations described herein. For example, CSC 460 may select a particular CHF 455, out of a group of candidate CHFs 455, based on a request from SMF 420 and/or some other device or system that tracks, or is capable of tracking, usage associated with UE 405. As described herein, the selection may be based on information from several sources, such UDM 440, CSCR 465, and/or one or more other. In some embodiments, CSC 460 may generate a score for each candidate CHF 455 based on UE/profile information associated with a given UE 405 and CHF selection criteria associated with each candidate CHF 455 (e.g., where the scores reflect a measure of similarity between some or all of the CHF selection criteria and some or all of the UE/profile information associated with UE 405), and select a particular one of the candidate CHFs 455 based on the scores. While shown separately in FIG. 4, in some embodiments, SMF 420 may implement some or all of the functionality described herein with respect to CSC 460.

CSCR 465 may include one or more devices, systems, VNFs, etc., that store information associated with CHFs 455 (e.g., CHF selection criteria). CSCR 465 may provide some or all of the stored information to CSC 460 and/or other devices. In some embodiments, CSC 460 may be communicatively coupled with, may be implemented by, or may implement features of a Network Repository Function ("NRF") (not explicitly shown in this figure). While shown separately in FIG. 4, in some embodiments, CSC 460 and/or SMF 420 may implement some or all of the functionality described herein with respect to CSCR 465.

SIR 470 may include one or more devices, systems, VNFs, etc. that store information regarding a subscriber. SIR 470 may provide some or all of the stored information to one or more other devices. As described above, for example, SIR 470 may provide subscription information to SMF 420 and/or CSC 460. In some instances (not described herein), SIR 470 may provide subscriber information to UDM 440. In some embodiments, SIR 470 may be communicatively coupled with, may be implemented by, or may implement features of a Unified Data Repository ("UDR") (not explicitly shown in this figure).

Figure 5:
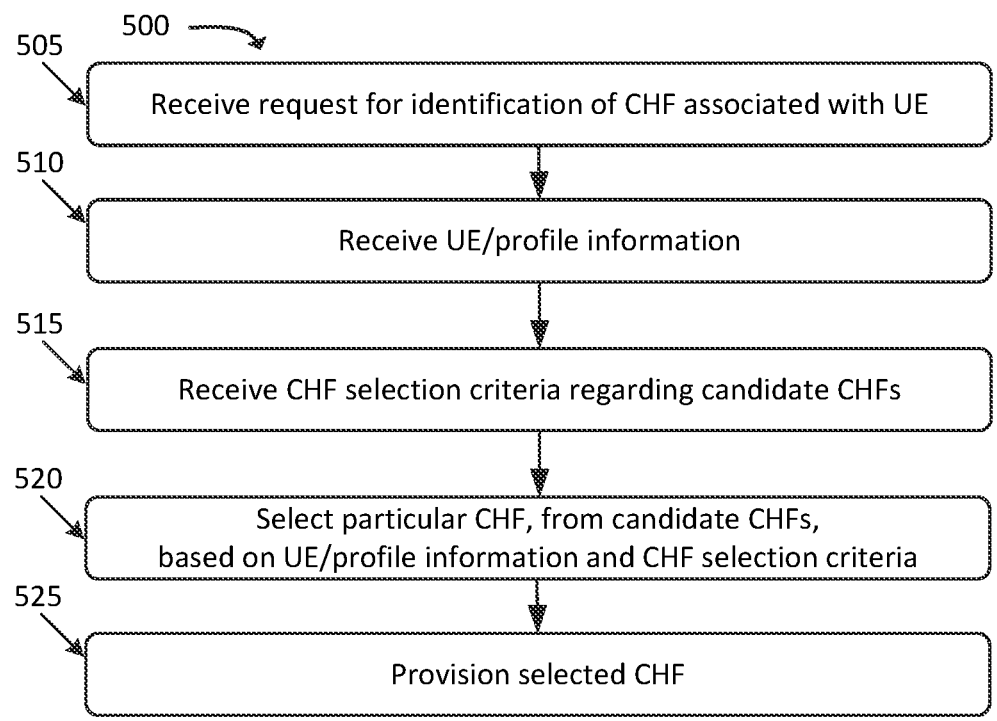
FIG. 5 illustrates an example process for selecting a CHF for a particular UE out of a set of candidate CHFs, in accordance with some embodiments.

FIG. 5 illustrates an example process for the selection of one or more CHFs 455 to be selected (e.g., from a set of candidate CHFs 455) in accordance with some embodiments described herein. In some embodiments, process 500 may be performed by CSC 460. In some embodiments, some or all of process 500 may be performed by one or more other devices or systems (e.g., SMF 420 and/or one or more other devices or systems).

As shown, process 500 may include receiving (at 505) a request for identification of an appropriate CHF. The request may be received from a network function, such as SMF 420, after UE 405 establishes a bearer with a network with which SMF 420 is associated. As another example, the request may be received from a TAS, a messaging application server, and/or some other source. The request may include information identifying UE 405 (e.g., SUPI, GIPSI, MDN, IMSI, IMEI, etc.) and/or information regarding one or more established bearers associated with UE 405 (e.g., a service type, application identifier, bearer identifier, and/or other information associated with a bearer established between UE 405 and the network).

Process 500 may further include receiving (at 510) information regarding UE 405 or a profile associated with UE 405. As described above, the information may be received from a repository such as SIR 470, UDM 440, and/or some other device or system that stores information regarding UE 405. In some embodiments (e.g., as described in regard to FIGS. 1 and 2 above), SMF 420 may provide the information regarding UE 405 or a profile associated with UE 405. The information may, in some embodiments, be received based on a request from CSC 460 (e.g., where CSC 460 requests the information based on receiving (at 505) the request). In some embodiments, CSC 460 may obtain or otherwise receive the information, regarding UE 405, independently of the request (received at 505). As mentioned above, the UE/profile information may include information regarding UE 405 (and/or a subscriber or subscription associated with UE 405), which may not have been included in the request (at 505). For example, the UE/profile information may indicate one or more levels of service or priority associated with UE 405, demographics information associated with a subscriber associated with UE 405, a geographic location of UE 405, an indication of a particular CHF 455 that should be used for charging associated with UE 405, and/or other information.

Process 500 may further include receiving (at 515) CHF selection criteria. As discussed above, the CHF selection criteria may be received from CSCR 465. The CHF selection criteria may contain identifier information such as the GIPSI, SUFI, PLMN identifier or other UE 405 identifiers, and/or other information such as the service type, user type, price plan type, service provider, device type, vendor identification, geographic location (e.g., a geographic location in which CHF 455 is located, and/or a geographic location or region for which CHF 455 should be selected), slice ID, charging event type, charging type, and/or other information that may be relevant to the selection or identification of a particular CHF 455 from a set of candidate CHFs 455.

Process 500 may further include selecting (at 520) a particular CHF 455 based on UE/profile and/or CHF selection criteria. Selection may include comparing CHF selection criteria to UE/profile information. As described above, in some embodiments, CSC 460 may generate a score based on a measure of similarity between CHF selection criteria for each candidate CHF 455 and UE/profile. In some embodiments, CSC 460 may rank CHFs 455 based on the generated scores. CSC 460 may select a particular CHF 455 based on the ranking. For instance, in some embodiments, CSC 460 may select a highest ranking CHF 455. In other embodiments, CSC 460 may select a differently ranked CHF 455.

In some embodiments, CSC 460 may select CHF 455 based on considerations other than a score that reflects similarity between CHF selection criteria and UE/profile information. For example, in some embodiments, profile information for a given UE 405 may indicate a particular CHF 455 that should be used for UE 405. As another example, profile information for a given UE 405 may indicate a particular CHF 455 that should be used for UE 405 for a particular traffic type, slice ID, or application identifier (and/or that a different CHF 455 should be used for a different traffic type, slice ID, or application identifier). In some embodiments, this profile information may supersede other considerations. For example, even if UE/profile information for UE 405 would be considered "more similar" to CHF selection criteria of a first CHF 455, a second CHF 455 may be selected for UE 405 if the UE/profile information indicates that the second CHF 455 should be selected for UE 405.

Similarly, in some embodiments, CHF selection criteria may indicate a particular UE 405 (or group of UEs 405) that are associated with a particular CHF 455. In these scenarios, this CHF selection criteria may supersede other considerations. For example, even if UE/profile information for UE 405 would be considered "more similar" to CHF selection criteria of a first CHF 455, a second CHF 455 may be selected for UE 405 if the CHF selection criteria for the second CHF 455 indicates that UE 405 is associated with the second CHF 455.

Process 500 may further include provisioning (at 525) the selected CHF 455. CSC 460 may, for example, provide identification or addressing information, associated with the selected CHF 455, to a requestor of the information (e.g., SMF 420, a TAS, etc.), and/or may forward such information to one or more other devices or systems that track usage associated with UE 405. Accordingly, the requesting device or system (or other suitable device or system) may track UE usage (e.g., a particular bearer, in situations where different CHFs 455 are selected for different bearers associated with UE 405) and provide usage information to the selected CHF 455.

Figure 6:
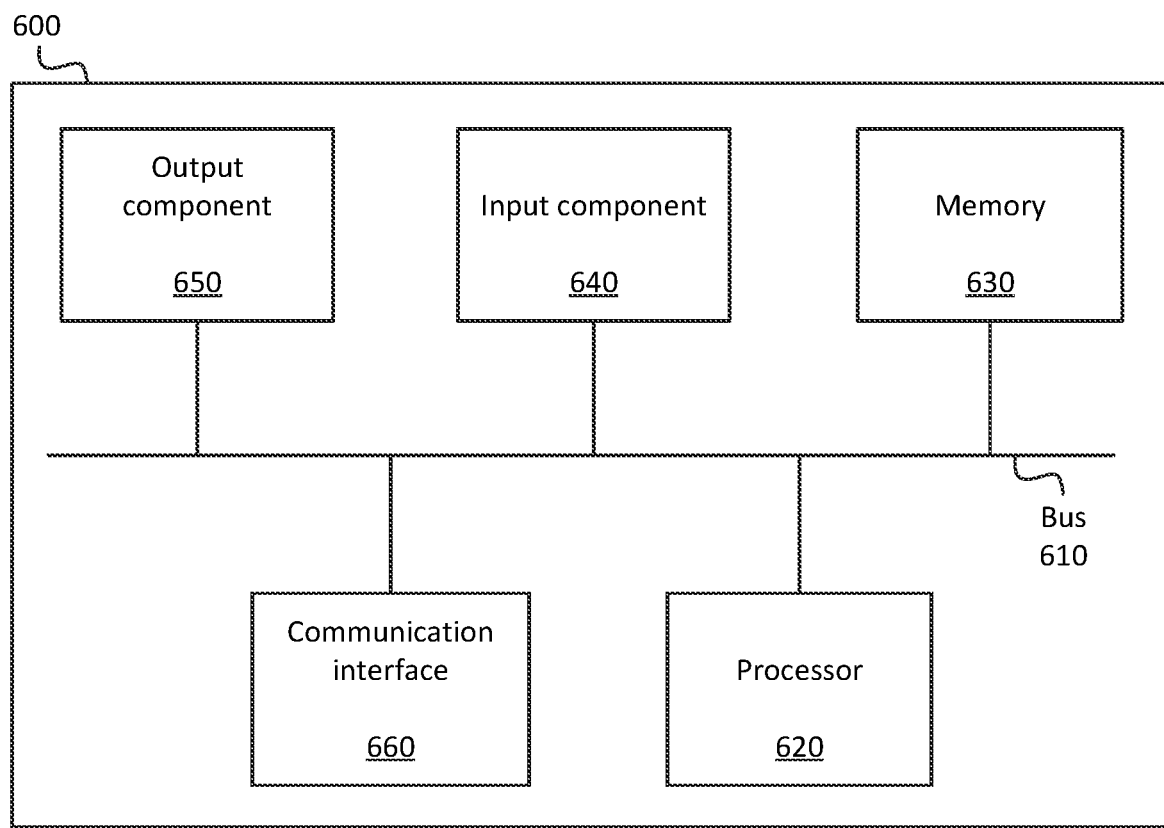
FIG. 6 illustrates example functional components of one or more devices, in accordance with one or more embodiments described herein.

FIG. 6 illustrates example components of device 600. One or more of the devices described above may include one or more devices 600. Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regards to FIGS. 1, 2, and 5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain information associating a plurality of instances of a particular network function, associated with a wireless network, with a plurality of traffic types, wherein the information indicates that a first instance of the particular network function is associated with at least a first traffic type of the plurality of traffic types;
receive a first indication that a particular User Equipment ("UE") is engaged in a first communication session, via the wireless network, that is associated with the first traffic type;
select the first instance of the network function out of the plurality of instances of the network function based on receiving the first indication that the first communication session is associated with the first traffic type;
output a second indication to the wireless network that the first instance of the network function has been selected,
wherein, based on receiving the second indication, one or more network devices of the wireless network provide usage information associated with the wireless network by the particular UE to the first instance of the network function,
determine that the particular UE is engaged in a second communication session via the wireless network, wherein the second communication session is associated with a second traffic type that is different from the first traffic type;
determine that a second instance of the particular network function, of the plurality of instances of the particular network function, is associated with the second traffic type;
select the second instance of the particular network function from the plurality of instances of the particular network function based on the determination that the particular UE is engaged in the second communication session associated with the second traffic type and the determination that the second instance of the particular network function is associated with the second traffic type; and
provide, to the wireless network, an identification of the selected second instance of the particular network function, wherein the one or more network devices of the wireless network provide usage information via the second communication session by the particular UE to the second instance of the particular network function.

2. The device of claim 1, wherein the one or more processors are further configured to:
generate a plurality of scores that each indicate a measure of similarity between one or more attributes of the UE to respective selection criteria associated with each instance of the particular network function; and
rank the plurality of instances of the particular network function according to the respective generated scores, wherein selecting the first instance of the particular network function is further based on the ranking.

3. The device of claim 2, wherein selecting the first instance of the particular network function further includes:
determining that the first instance of the particular network function is associated with a highest ranked score of the generated plurality of scores; and
selecting the first instance of the particular network function based on the determination that the first instance of the particular network function is associated with the highest ranked score.

4. The device of claim 1, wherein selecting the first instance of the particular network function further includes:
determining that one or more of the other instances of the particular network function, of the plurality of instances of the particular network function, are not associated with the first traffic type.

5. The device of claim 1, wherein the particular UE is engaged in the first and second communication sessions simultaneously.

6. The device of claim 1, wherein the one or more network devices of the wireless network include a device that facilitates establishment of communication sessions between one or more UEs and the wireless network.

7. The device of claim 6, wherein the device that facilitates establishment of communication sessions between one or more UEs and the wireless network includes a Session Management Function ("SMF").

8. A non-transitory computer-readable medium, storing a plurality of processor-executable instructions to:
maintain information associating a plurality of instances of a particular network function, associated with a wireless network, with a plurality of traffic types, wherein the information indicates that a first instance of the particular network function is associated with at least a first traffic type of the plurality of traffic types;
receive a first indication that a particular User Equipment ("UE") is engaged in a first communication session, via the wireless network, that is associated with the first traffic type;
select the first instance of the network function out of the plurality of instances of the network function based on receiving the first indication that the first communication session is associated with the first traffic type;
output a second indication to the wireless network that the first instance of the network function has been selected, wherein, based on receiving the second indication, one or more network devices of the wireless network provide usage information associated with the wireless network by the particular UE to the first instance of the network function;
determine that the particular UE is engaged in a second communication session via the wireless network, wherein the second communication session is associated with a second traffic type that is different from the first traffic type;
determine that a second instance of the particular network function, of the plurality of instances of the particular network function, is associated with the second traffic type;
select the second instance of the particular network function from the plurality of instances of the particular network function based on the determination that the particular UE is engaged in the second communication session associated with the second traffic type and the determination that the second instance of the particular network function is associated with the second traffic type; and
provide, to the wireless network, an identification of the selected second instance of the particular network function, wherein the one or more network devices of the wireless network provide usage information via the second communication session by the particular UE to the second instance of the particular network function.

9. The non-transitory computer-readable medium of claim 8, wherein the plurality of processor-executable instructions further include processor-executable instructions to:
generate a plurality of scores that each indicate a measure of similarity between one or more attributes of the UE to respective selection criteria associated with each instance of the particular network function; and
rank the plurality of instances of the particular network function according to the respective generated scores, wherein selecting the first instance of the particular network function is further based on the ranking.

10. The non-transitory computer-readable medium of claim 9, wherein selecting the instance of the particular network function further includes:
determining that the first instance of the particular network function is associated with a highest ranked score of the generated plurality of scores; and selecting the first instance of the particular network function based on the determination that the first instance of the particular network function is associated with the highest ranked score.

11. The non-transitory computer-readable medium of claim 8, wherein selecting the first instance of the particular network function further includes:
determining that one or more of the other instances of the particular network function, of the plurality of instances of the particular network function, are not associated with the first traffic type.

12. The non-transitory computer-readable medium of claim 8, wherein the particular UE is engaged in the first and second communication sessions simultaneously.

13. The non-transitory computer-readable medium of claim 8, wherein the one or more network devices of the wireless network include a device that facilitates establishment of communication sessions between one or more UEs and the wireless network.

14. The non-transitory computer-readable medium of claim 13, wherein the device that facilitates establishment of communication sessions between one or more UEs and the wireless network includes a Session Management Function ("SMF").

15. A method, comprising:
maintaining information associating a plurality of instances of a particular network function, associated with a wireless network, with a plurality of traffic types, wherein the information indicates that a instance of the particular network function is associated with at least a particular traffic type of the plurality of traffic types;
receiving a first indication that a particular User Equipment ("UE") is engaged in a communication session, via the wireless network, that is associated with the particular traffic type of the plurality of traffic types;
generating a plurality of scores that each indicate a measure of similarity between one or more attributes of the particular UE to respective selection criteria associated with each instance of the particular network function; and
ranking the plurality of instances of the particular network function according to the respective generated scores;
selecting the particular instance of the network function out of the plurality of instances of the network function based on receiving the first indication that the communication session is associated with the particular traffic type, wherein selecting the particular instance of the particular network function is further based on the ranking, wherein selecting the particular instance of the particular network function further includes:
determining that the particular instance of the particular network function is associated with a highest ranked score of the generated plurality of scores, and
selecting the particular instance of the particular network function based on the determination that the particular instance of the particular network function is associated with the highest ranked score; and
outputting a second indication to the wireless network that the particular instance of the network function has been selected,
wherein, based on receiving the second indication, one or more network devices of the wireless network provide usage information associated with the wireless network by the particular UE to the particular instance of the network function.

16. The method of claim 15, wherein selecting the particular instance of the particular network function further includes:
determining that one or more of the other instances of the particular network function, of the plurality of instances of the particular network function, are not associated with the particular traffic type.

17. The method of claim 15, wherein the communication session is a first communication session, wherein the particular traffic type is a first traffic type, and wherein the instance of the particular network function is a first instance, the method further comprising:
determining that the particular UE is engaged in a second communication session via the wireless network, wherein the second communication session is associated with a second traffic type that is different from the first traffic type;
determining that a second instance of the particular network function, of the plurality of instances of the particular network function, is associated with the second traffic type;
selecting the second instance of the particular network function from the plurality of instances of the particular network function based on the determination that the particular UE is engaged in the second communication session associated with the second traffic type and the determination that the second instance of the particular network function is associated with the second traffic type; and
providing, to the wireless network, an identification of the selected second instance of the particular network function, wherein the one or more network devices of the wireless network provide usage information via the second communication session by the particular UE to the second instance of the particular network function.

18. The method of claim 17, wherein the particular UE is engaged in the first and second communication sessions simultaneously.

19. The method of claim 15, wherein the one or more network devices of the wireless network include a device that facilitates establishment of communication sessions between one or more UEs and the wireless network.

20. The method of claim 19, wherein the device that facilitates establishment of communication sessions between one or more UEs and the wireless network includes a Session Management Function ("SMF").

\* \* \* \* \*